US008965985B2

(12) United States Patent
Fan et al.

(10) Patent No.: US 8,965,985 B2
(45) Date of Patent: Feb. 24, 2015

(54) METHOD, SYSTEM, AND SERVER FOR PROCESSING POINT TO MULTIPOINT PUSH MESSAGE (75) Inventors: Shunan Fan, Beijing (CN); Jian Yang, Beijing (CN); Lei Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 149 days.

(21) Appl. No.: 13/300,813

(22) Filed: Nov. 21, 2011

(65) Prior Publication Data

US 2012/0066330 A1   Mar. 15, 2012

Related U.S. Application Data (63) Continuation of application No. PCT/CN2009/071914, filed on May 21, 2009.

(51) Int. Cl.
*G06F 15/16* (2006.01)
*H04L 12/18* (2006.01)
*H04L 12/701* (2013.01)
*H04W 4/00* (2009.01)
*H04W 76/00* (2009.01)
*H04L 29/08* (2006.01)

(52) U.S. Cl.
CPC ............ *H04L 12/1859* (2013.01); *H04L 45/00* (2013.01); *H04W 4/001* (2013.01); *H04W 76/002* (2013.01); *H04L 67/26* (2013.01)
USPC ........................................................ 709/206

(58) Field of Classification Search
None
See application file for complete search history.

(56) References Cited

U.S. PATENT DOCUMENTS 6,879,808 B1 * 4/2005 Nations et al. ............... 455/12.1
7,299,050 B2 * 11/2007 Delaney et al. ............... 455/445

(Continued)

FOREIGN PATENT DOCUMENTS

CN   101141694   3/2008
CN   101277311   10/2008

(Continued)

OTHER PUBLICATIONS

Foreign Communication From A Counterpart Application, Chinese Application 200980158872.8, Chinese Office Action dated Feb. 22, 2013, 8 pages.

(Continued)

*Primary Examiner* — Jason K. Gee
*Assistant Examiner* — Olanrewaju Bucknor
(74) *Attorney, Agent, or Firm* — Conley Rose, P.C.; Grant Rodolph; Nicholas K. Beaulieu (57) ABSTRACT Embodiments of the present invention relate to a method, a system and a server for processing a Point to Multipoint (PTM) Push message. The method includes: receiving a Push message, in which the Push message includes indication information and push content; mapping address information of target terminals that correspond to the indication information; and sending, according to the address information of the target terminals, the push content to the target terminals that correspond to the indication information. In the embodiments of the present invention, the Push message is sent, according to the indication information included in the received Push message, to the target terminals that correspond to the indication information, and it is unnecessary to carry a large amount of the address information of the target terminals in the Push message, thereby saving network resources.

24 Claims, 5 Drawing Sheets (56) References Cited

U.S. PATENT DOCUMENTS

| | | | |
|---|---|---|---|
| 7,596,380 B2* | 9/2009 | Kim | 455/452.1 |
| 7,688,771 B2* | 3/2010 | Lee et al. | 370/312 |
| 8,130,686 B2* | 3/2012 | Rao et al. | 370/312 |
| 8,341,274 B2* | 12/2012 | Li et al. | 709/227 |
| 8,433,346 B2* | 4/2013 | Fischer | 455/466 |
| 8,527,607 B2* | 9/2013 | Alakoski et al. | 709/217 |
| 8,611,210 B2* | 12/2013 | Lehtovirta | 370/228 |
| 2003/0088647 A1* | 5/2003 | ShamRao | 709/219 |
| 2004/0259553 A1* | 12/2004 | Delaney et al. | 455/445 |
| 2005/0249188 A1* | 11/2005 | Hayashi | 370/349 |
| 2005/0254439 A1* | 11/2005 | Fleck et al. | 370/256 |
| 2006/0156370 A1* | 7/2006 | Parantainen | 725/132 |
| 2006/0179115 A1* | 8/2006 | Garcia-Martin et al. | 709/217 |
| 2007/0100981 A1* | 5/2007 | Adamczyk et al. | 709/223 |
| 2008/0119172 A1* | 5/2008 | Rao et al. | 455/414.1 |
| 2008/0162637 A1* | 7/2008 | Adamczyk et al. | 709/204 |
| 2009/0005059 A1* | 1/2009 | Hayashi | 455/452.1 |
| 2009/0305712 A1* | 12/2009 | Franceschini et al. | 455/450 |
| 2010/0046409 A1* | 2/2010 | Lohmar et al. | 370/312 |
| 2010/0246452 A1* | 9/2010 | Rajan | 370/277 |
| 2011/0047583 A1* | 2/2011 | Howard et al. | 725/109 |
| 2011/0134206 A1* | 6/2011 | Kjesbu et al. | 348/14.08 |
| 2011/0173291 A1* | 7/2011 | Alakoski et al. | 709/217 |

FOREIGN PATENT DOCUMENTS

| | | |
|---|---|---|
| CN | 101277467 | 10/2008 |
| CN | 101355488 | 1/2009 |

OTHER PUBLICATIONS

Foreign Communication From A Counterpart Application, Chinese Application 200980158872.8, Partial Translation of Chinese Office Action dated Feb. 22, 2013, 10 pages.

International Search Report from P.R. China in International Application No. PCT/CN2009/071914, mailed Feb. 25, 2010.

Written Opinion of the International Search Authority related to International Application No. PCT/CN2009/071914; mailed Feb. 10, 2010, for Huawei Technologies Co., Ltd.

* cited by examiner

METHOD, SYSTEM, AND SERVER FOR PROCESSING POINT TO MULTIPOINT PUSH MESSAGE

CROSS-REFERENCE TO RELATED APPLICATIONS

This application is a continuation of International Application No. PCT/CN2009/071914, filed on May 21, 2009, which is hereby incorporated by reference in its entirety.

FIELD OF THE INVENTION

The present invention relates to the field of communications technologies, and in particular, to a method and a system for processing a Point to Multipoint (PTM) push message, a push server, and a Push Initiator (PI) server.

BACKGROUND OF THE INVENTION

A Push technology is a content distribution mechanism based on a client/server work mode, in which information is actively sent by a server to a client. The push technology permits a PI to push information and transmit an instruction to a Push Proxy Gateway (PPG), and the PPG transmits the information and the instruction to a terminal. The PPG generally employs a Push Access Protocol (PAP) to obtain a message from the PI, and then distributes the content to a user through a Push-Over the Air (OTA) protocol. The push technology is generally used in a message notification system, and may be applicable to various industries, such as, securities, a bank, a commerce website, and so on.

A Device Management (DM) service is used to solve a problem encountered in use of a network device. The service performs operations such as installation and upgrading of software and firmware through an OTA mode, and provides more humanized and personalized services, so as to improve user experience. A DM service initiator may be a mobile operator, a service provider, or an information management department of a cooperation partner; and it may also be considered that a DM server implements a related function of the DM service. In the push technology, the DM server is the PI.

In the DM service, a Push message is used to activate a target terminal to establish a session connection with the DM server. As for a point-to-point service, the DM server sends a Push message to the PPG, the PPG converts the received Push message, and then sends the converted Push message to a corresponding target terminal, and the target terminal sends a corresponding message, so as to establish a session connection with the DM server. As for a PTM service, the DM server needs to provide address information of multiple target terminals to be managed and send one or multiple Push messages carrying the address information of the multiple target terminals to the PPG, and the PPG converts the received one or multiple Push messages, and sends the converted one or multiple Push messages to corresponding target terminals respectively.

Depending on a difference of broadcast and/or multicast technologies involved in PTM bearing modes, the following several PTM bearing modes are specifically defined in the industry: a CBS bearing mode corresponding to a Cell Broadcast Service (CBS), an MBMS bearing mode corresponding to a Multimedia Broadcast Multicast Service (MBMS), a BCMCS bearing mode corresponding to Broadcast/Multicast Services (BCMCS), a BCAST bearing mode corresponding to a Mobile Broadcast (BCAST) service, and so on.

A Push message whose target receiving ends are multiple terminals may be sent to the multiple terminals through a PTM bearing mode, that is, one or more of the following modes: the CBS bearing mode, the MBMS bearing mode, the BCMCS bearing mode, the BCAST bearing mode, and so on.

In the foregoing management method for the PTM service in the prior art, the DM server needs to maintain and manage the address information of multiple target terminals, and the address information of the multiple target terminals occupies many network resources when the Push message carrying the address information of the multiple target terminals is sent to the PPG, causing a waste of the network resources.

SUMMARY OF THE INVENTION

Embodiments of the present invention provide a method, a system, and a server for processing a PTM Push message, thereby saving network resources.

An embodiment of the present invention provides a method for processing a PTM Push message, which includes:

receiving a Push message, in which the Push message includes indication information and push content;

mapping address information of target terminals that correspond to the indication information; and sending the push content to the target terminals according to the address information of the target terminals.

An embodiment of the present invention provides a push server, which includes:

a receiving module, configured to receive a Push message, in which the Push message includes indication information and push content;

a mapping module, configured to map address information of target terminals that correspond to the indication information; and a sending module, configured to send the push content to the target terminals according to the address information of the target terminals.

An embodiment of the present invention provides a PI server, which includes:

a generating module, configured to generate a Push message including indication information; and a sending module, configured to send the Push message including the indication information to a push server, so that the push server maps address information of target terminals that correspond to the indication information and sends the Push message to the target terminals according to the address information of the target terminals.

An embodiment of the present invention provides a system for processing a PTM Push message, which includes:

a PI server, configured to generate and send a Push message, in which the Push message includes indication information and push content; and a push server, configured to receive the Push message; map address information of target terminals that correspond to the indication information; and send the push content to target terminals according to the address information of the target terminals.

In the embodiments of the present invention, according to the indication information included in the received Push message, the Push message is sent to the target terminals that correspond to the indication information, and it is unnecessary to carry a large amount of address information of the target terminals in the Push message, thereby saving the network resources.

BRIEF DESCRIPTION OF THE DRAWINGS

FIG. 1 is a flow chart of a method for processing a PTM Push message according to a first embodiment of the present invention;

FIG. 2 is a flow chart of a method for processing a PTM Push message according to a second embodiment of the present invention;

FIG. 3 is a flow chart of a method for processing a PTM Push message according to a third embodiment of the present invention;

FIGS. 4A and 4B are a flow chart of a method for processing a PTM Push message according to a fourth embodiment of the present invention;

FIG. 5 is a schematic structural diagram of a push server according to a fifth embodiment of the present invention;

FIG. 6 is a schematic structural diagram of a PI server according to a sixth embodiment of the present invention;

FIG. 7 is a schematic structural diagram of an information server according to a seventh embodiment of the present invention; and FIG. 8 is a schematic structural diagram of a system for processing a PTM Push message according to an eighth embodiment of the present invention.

DETAILED DESCRIPTION OF THE EMBODIMENTS

Technical solutions in the embodiments of the present invention are further described in detail below with reference to the accompanying drawings and embodiments.

Figure 1:
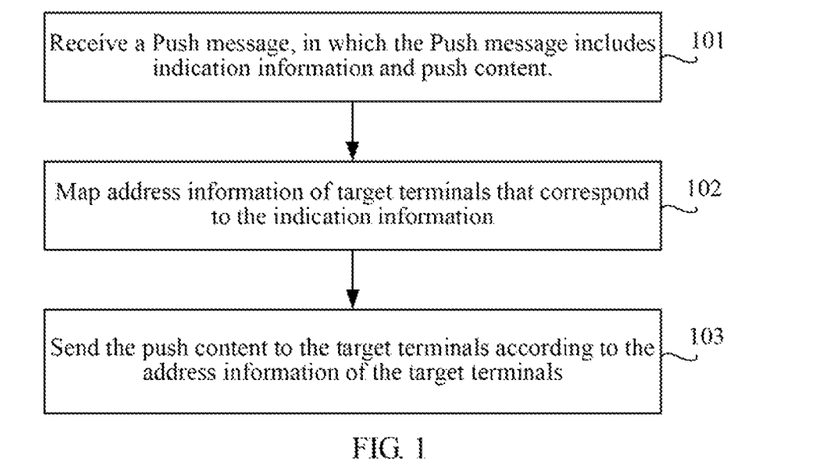

FIG. 1 is a flow chart of a method for processing a PTM Push message according to a first embodiment of the present invention. As shown in FIG. 1, the embodiment includes the following steps:

Step 101: Receive a Push message, in which the Push message includes indication information and push content.

Step 102: Map address information of target terminals that correspond to the indication information.

Step 103: Send the push content to the target terminals according to the address information of the target terminals.

In this embodiment, according to the received indication information, address information of target terminals that correspond to the indication information is mapped, and the push content is sent to the target terminals, so it is unnecessary to carry a large amount of address information of the target terminals in the Push message, thereby saving network resources.

Figure 2:
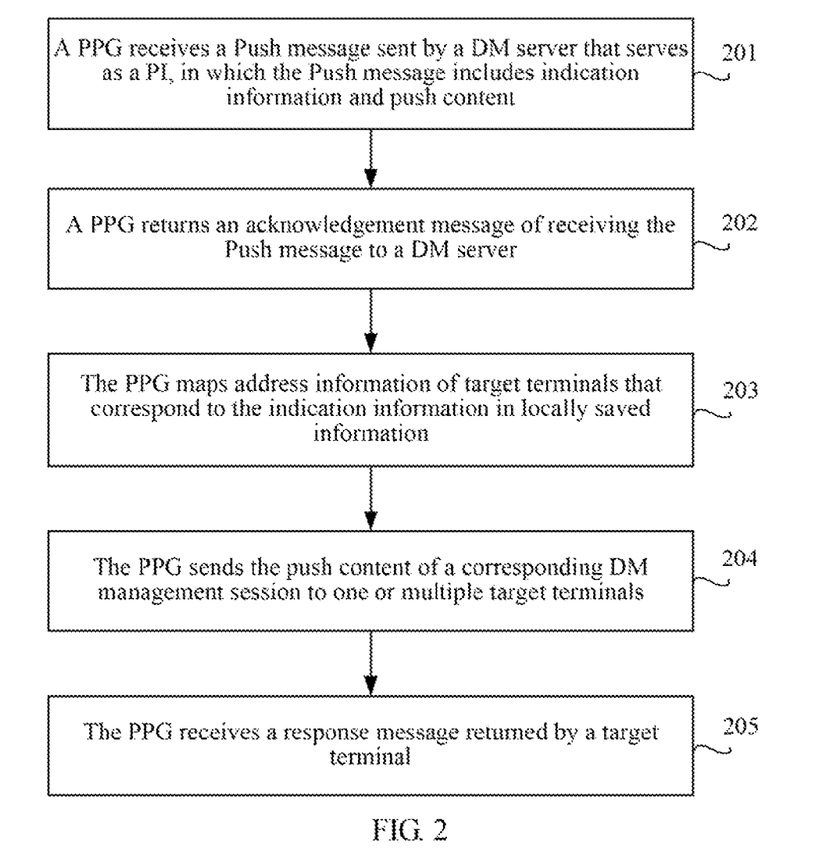

FIG. 2 is a flow chart of a method for processing a PTM Push message according to a second embodiment of the present invention. This embodiment is implemented by cooperative work of a network device (a DM server), terminals, and a PPG in a mobile communication system.

As shown in FIG. 2, the embodiment specifically includes the following steps:

Step 201: A PPG receives a Push message sent by a DM server that serves as a PI, in which the Push message includes indication information and push content.

An interface between the DM server and the PPG needs to have a function of transferring the Push message that includes the indication information, and the Push message may be encapsulated through PAP. The indication information may be different condition information to which target terminals are indicated to conform, for example, terminal model information, terminal capability information, target user preference information, target user position information, sending method information, or target user attribute information. For example, assuming that the indication information is upgrading V720-model mobile phones, when acquiring the indication information, the PPG may query address information of target terminals that correspond to the V720-model mobile phones, in which the address information is used for sending the Push message to the target terminals; and the indication information may also be a target terminal address type, and the address type specifies a type to which address information of a group of target terminals conforms.

The indication information may be carried through a header field, a value field, or a message body of the Push message that is encapsulated through PAP, for example, carried in the address information; or may be carried by extending the header field or the value field of the Push message; or may also be carried through the message body. The following describes carrying manners of the indication information with reference to specific examples.

(1) Manner of Carrying the Indication Information in the Header Field of the Push Message

```
Content-Type: multipart/related; boundary=asdlfkjiurwghasf;
                              type="application/vnd.syncml.notification"
--asdlfkjiurwghasf
Content-Type: application/ vnd.syncml.notification
<?xml version="1.0"?>
<!DOCTYPE pap PUBLIC "-//OPENMOBILEALLIANCE//DTD PAP 2.1//EN"
        "http://www.openmobilealliance.org/tech/DTD/pap_2.1.dtd"
        [<?wap-pap-ver supported-versions="2.1,2.0,1.*"?>]>
<pap>
   <push-message push-id="9fjeo39jf084@pi.com">
      <address  address-value="wappush=12345/type=V720@ppg.CMCC.com"></address>
   </push-message>
</pap>
...message body
```

The preceding example is a section of an XML document, in which an indicator of the indication information given in the XML document is V720@ppg.CMCC.com, suggesting that the indication information of upgrading V720-model terminals in a China Mobile network is carried through the header field.

(2) Manner of Carrying the Indication Information by Extending the Header Field or the Value Field of the Push Message

```
<!ELEMENT push-message ( address+, quality-of-service?, indicator+ ) >
<!ATTLIST push-message
        push-id                    CDATA              #REQUIRED
        replace-push-id            CDATA              #IMPLIED
        replace-method             ( pending-only
                                    | all )           "all"
        deliver-before-timestamp   %Datetime;         #IMPLIED
        deliver-after-timestamp    %Datetime;         #IMPLIED
        source-reference           CDATA              #IMPLIED
        ppg-notify-requested-to    CDATA              #IMPLIED
        progress-notes-requested   ( true | false )   "false"
>
<!ELEMENT address EMPTY >
<!ATTLIST address
        address-value              CDATA              #REQUIRED
>
<!ELEMENT indicator EMPTY >
<!ATTLIST indicator
        indicator-value            CDATA              #IMPLIED
>
<!ELEMENT quality-of-service EMPTY >
<!ATTLIST quality-of-service
        priority                   ( high | medium | low )        "medium"
        delivery-method            ( confirmed | preferconfirmed
        | confirmed-with-response
        | oneshot
| unconfirmed | notspecified ) "notspecified"
        network                    CDATA              #IMPLIED
        network-required           ( true | false )   "false"
        bearer                     CDATA              #IMPLIED
        bearer-required            ( true | false )   "false"
>
...message body
```

The preceding example is a section of an XML document, in which an extended value field of the XML document is "indicator", and the indication information is given in the value field; or a V720 device covered by a specific network is given through a value field of a "network" parameter in a QoS parameter.

(3) Manner of Carrying the Indication Information in the Message Body

```
......
--asdlfkjiurwghasf (message body portion)
Date: Tue, 31 Jul 2001 10:13:00 GMT
Content-Language: en
Content-Length: 320
Content-Type: text/vnd.wap.si
X-Wap-Application-Id: x-wap-application: vnd.syncml.notification
<?xml version="1.0"?>
    <!DOCTYPE si PUBLIC "-//OMA//DTD SI 1.0//EN"
        "http://www.openmobilealliance.com/tech/DTD/si_1.0.dtd">
<trigger-message> ::= <digest><trigger>
<digest> ::= 128*BIT;
<trigger> ::= <trigger-hdr><trigger-body>
<trigger-hdr> ::= <version><ui-mode><initiator><future-use>
        <sessionid><length-identifier><server-identifier>
<version> ::= 10*BIT ;
<ui-mode> ::= <not-specified> / <background> / ; 'Background/Informative/
        <informative> / <user-interaction> ; User Interaction session'
<not-specified> ::= "00" ;
<background> ::= "01" ;
<informative> ::= "10" ;
<user-interaction> ::= "11" ;
<initiator> ::= <client> / <server> ;
<client> ::= "0" ;
<server> ::= "1" ;
<future-use> ::= 27*BIT ;
```

-continued

```
<sessionid> ::= 16*BIT ;
<length-identifier> ::= 8*BIT ;
<server-identifier> ::= <length-identifier>*CHAR ;
<trigger-body> ::= [<vendor-specific>]
<vendor-specific> ::= n*BIT ;
<indicator indicator-value=wappush=12345/type=V720@ppg.CMCC.com></indicator>
--asdlfkjiurwghasf
.......
```

The preceding example is a section of an XML document, and the XML document indicates that the indication information is given in the message body.

Step 202: The PPG returns an acknowledgement message of receiving the Push message to the DM server. This step is an optional step.

Step 203: The PPG maps address information of target terminals that correspond to the indication information. Specifically, the PPG maps the target terminals that correspond to the indication information in locally saved information for sending the Push message to the target terminals that are determined through mapping. For example, the address information of the target terminals is mapped.

In this embodiment, the PPG is an example of a Push server, the PPG needs to query V720-model target terminals in a current network, and acquire address information of these target terminals. This step may also be: The PPG judges whether the address information of the target terminals that correspond to the indication information is saved in the PPG, and maps the address information of these target terminals if the address information of the target terminals that correspond to the indication information is saved in the PPG.

Specifically, this step may be mapping address information of each of the target terminals that correspond to the indication information; or mapping multicast address information of a group to which the target terminals that correspond to the indication information belong, or mapping broadcast address information of the target terminals that correspond to the indication information.

For example, the indication information is an address type "CHANNLE1" of the target terminals, the PPG may map the "CHANNLE1" into address information of each of the target terminals; and the PPG may also map the "CHANNLE1" into the multicast address information of the group to which the target terminals belong; and the PPG may also map the "CHANNLE1" into the broadcast address information of the target terminals.

Step 204: The PPG simultaneously sends the push content of a corresponding DM management session to one or multiple target terminals according to a query result obtained in step 203.

The push content of the DM management session may be a DM notification message that is used to notify a target terminal of establishing a device management connection to the DM server.

The PPG may send the push content to the target terminals through a unicast mode, a broadcast mode, a multicast mode or any combination of the foregoing modes according to the query result. Specifically, if address information of each of the target terminals that correspond to the indication information is mapped in step 203, the PPG sends the push content to each of the target terminals through the unicast mode; if the multicast address information of the group to which the target terminals that correspond to the indication information belong is mapped in step 203, the PPG sends the push content to the target terminals through the multicast mode; and if the broadcast address information of the target terminals that correspond to the indication information is mapped in step 203, the PPG sends the push content to the target terminals through the broadcast mode.

A receiving target terminal may parse other information to determine whether the target terminal is a matched target terminal, that is, a V720 terminal, so as to further judges whether to establish a connection with a network.

In addition, the sending, by the PPG, the Push message through the multicast mode or the broadcast mode may specifically be: Send the Push message through a CBS bearer network, an MBMS bearer network, a BCMCS bearer network or a BCAST bearer network.

This step may also be sending a Push message of a corresponding DM management session to one or multiple target terminals, that is, the indication information and the push content are sent together.

Step 205: The PPG receives a response message returned by a target terminal, and this step may be an optional step.

In this embodiment, The PPG maps address information of corresponding target terminals according to the indication information included in the received Push message, and according to the indication information saved in the PPG, so it is unnecessary to carry a large amount of address information of the target terminals in the Push message, thereby saving network resources. The mapped address information may be address information of each of the target terminals, or the address information of the target terminals of the Push message, which is sent through the broadcast or multicast mod. Whether a target terminal is the target terminal receiving the Push message may be determined according to the indication information, and then next processing is performed. In addition, in this embodiment, the DM server does not need to maintain the address information of the target terminals in the network; when the DM server cannot acquire the address information of the target terminals that need to be managed, the sending of the Push message may also be implemented in this embodiment. In this way, security in acquiring user information by the DM server in the network may be ensured, thereby achieving a purpose of protecting user privacy. Meanwhile, the PPG provides functions of receiving the Push message, and implementing querying and matching, so as to bring forth better user experience.

Figure 3:
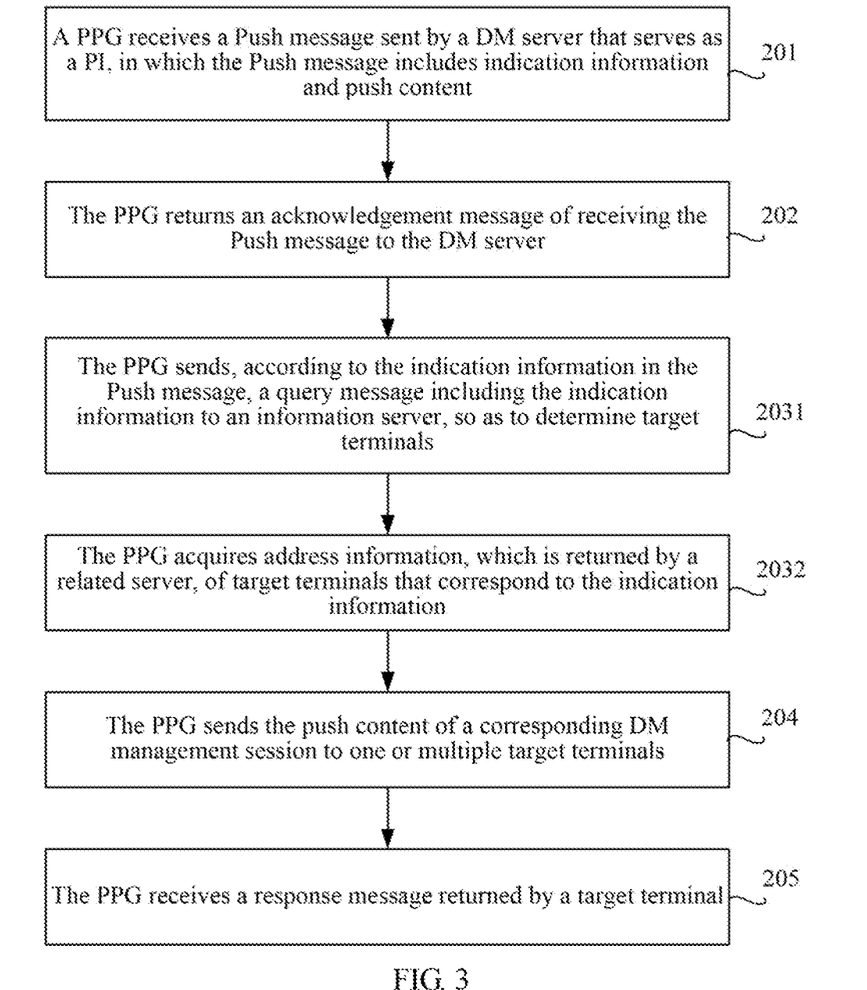

FIG. 3 is a flow chart of a method for processing a PTM Push message according to a third embodiment of the present invention. A difference of this embodiment from the embodiment shown in FIG. 2 lies in step 203, in this embodiment, step 203 may be replaced by the following steps:

Step 2031: The PPG sends, according to the indication information in the Push message, a query message including the indication information to an information server, so as to determine target terminals.

This step may be performed when the PPG determines that the address information of the target terminals that correspond to the indication information is not saved in the PPG.

In this embodiment, the query message may be sent to different information servers according to a difference of the indication information. The query message may be carried on a protocol such as a Session Initiation Protocol (SIP), a Hyper Text Transfer Protocol (HTTP) or an Extensible Markup Language (XML) Configuration Access Protocol (XCAP). The query message may include a piece of information, or may include multiple pieces of matched information.

Step 2032: The PPG acquires the address information, which is returned by the information server, of the target terminals that correspond to the indication information.

The address information, which is acquired by the PPG, of the target terminals that correspond to the indication information may be address information of each of the target terminals that correspond to the indication information; or multicast address information of a group to which the target terminals that correspond to the indication information belong, or broadcast address information of the target terminals that correspond to the indication information.

The information server may be any server that can implement the mapping of the indication information into the address information of the target terminals, such as a Presence server, a User Agent Profile (UAProf) server, a Converged IP Messaging (CPM) server, a Home Subscriber Server (HSS), a Home Location Register (fin a Converged Address Book (CAB) server, a Device Profile Evolution (DPE) server, an XML Document Management (XDM) server, a Condition Based URIs Selection (CBUS) server, a BCAST server, a Broadcast Multicast Service Center (BM-SC) server, and so on.

In this embodiment, the PPG queries and acquires the address information of the target terminals that correspond to the indication information from the information server according to the indication information included in the received Push message, so it is unnecessary to carry a large amount of address information of the target terminals in the Push message, thereby saving network resources. In addition, in this embodiment, the DM server does not need to maintain the address information of the target terminals in the network; when the DM server cannot acquire the address information of the target terminals that need to be managed, the sending of the Push message may also be implemented in this embodiment, so that security in acquiring user information by the DM server in the network may be ensured, thereby achieving a purpose of protecting user privacy. In this embodiment, a purpose of further upgrading may also be achieved when the DM server expects that terminals having a specified feature such as terminals in an area implement sending of notification of establishing a connection with the DM server at the same time. Meanwhile, the PPG provides functions of receiving the Push message, and implementing querying and matching, so as to bring forth better user experience.

Figure 4A:
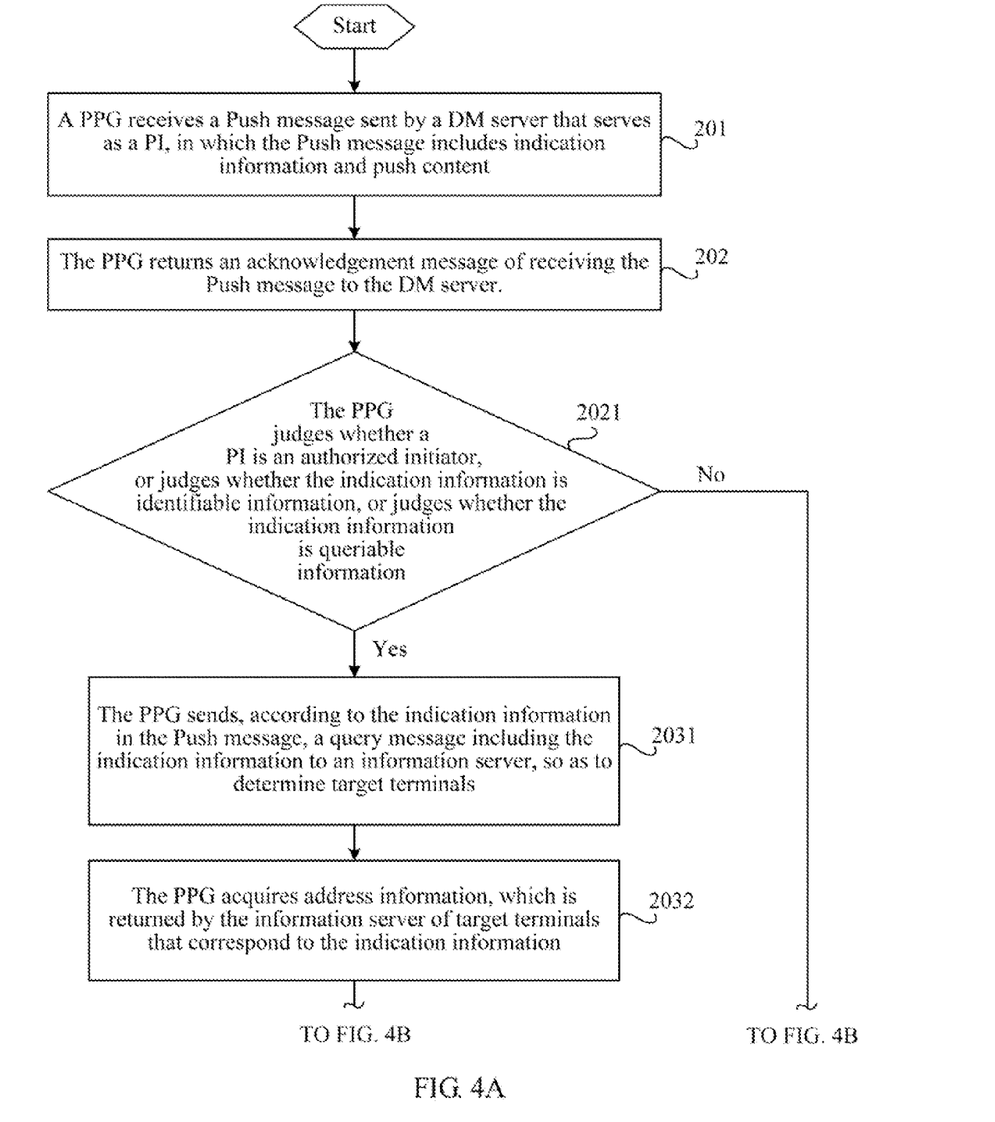
Figure 4B:
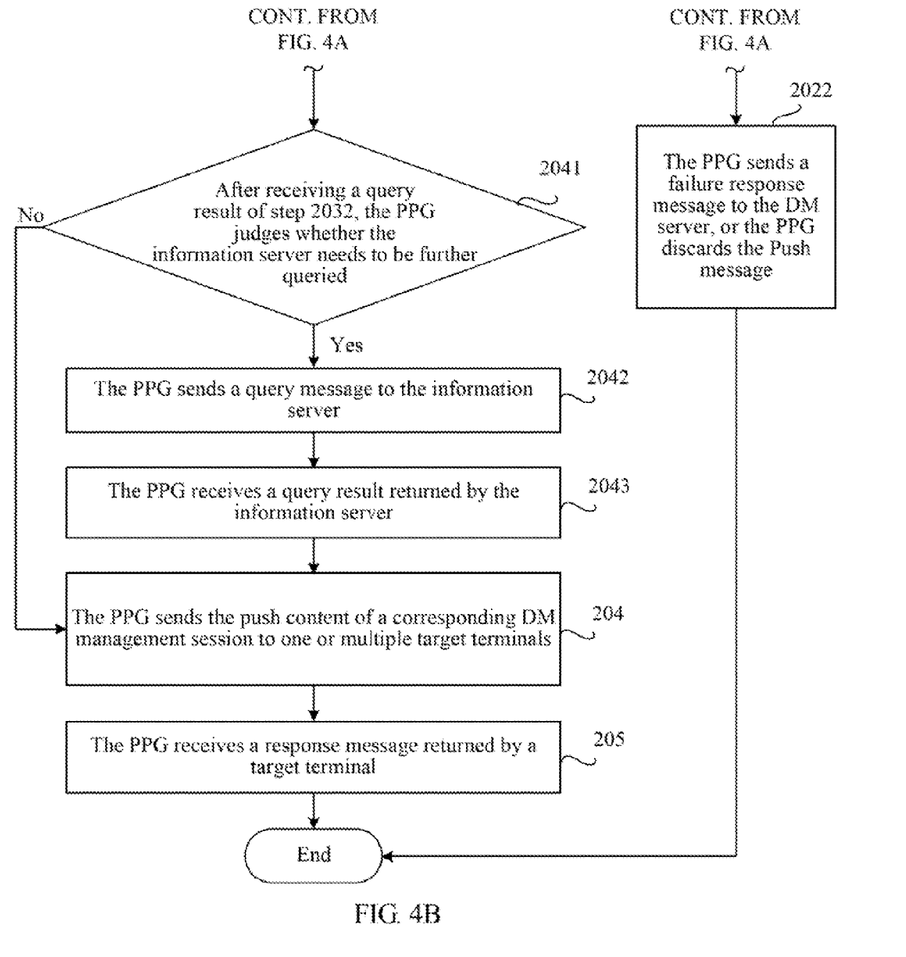

FIGS. 4A and 4B are a flow chart of a method for processing a PTM Push message according to a fourth embodiment of the present invention. In this embodiment, based on the embodiment shown in FIG. 3, before step 2031, the method further includes:

Step 2021: The PPG judges whether a PI (that is, the DM server) is an authorized initiator, or judges whether the indication information is identifiable information, or judges whether the indication information is queriable information. Step 2031 is performed if the PI is an authorized initiator, the indication information is identifiable information, or the indication information is queriable information; and step 2022 is performed if the PI is not an authorized initiator, the indication information is unidentifiable information, and the indication information is unqueriable information.

That is to say, before step 2031 is performed, the PPG needs to determine that the PI is an authorized initiator, or determine that the indication information is identifiable information, or determine that the indication information is queriable information.

Step 2022: The PPG sends a failure response message to the DM server, or the PPG discards the Push message. The process ends.

The failure response message is used to notify the DM server of information such as a failure of the Push request, a reason of the failure, or whether an attempt to re-send the Push message can be performed. The reason of the failure may be: The indication information is unidentifiable, or the DM server is not a subscribed user sending the Push message, or the indication information is unqueriable.

Steps 2021 and 2022 may also be used in the embodiment shown in FIG. 2.

Further, in this embodiment, before step 204 is performed, the method may further include:

Step 2041: After receiving a query result of step 2032, the PPG judges whether the information server needs to be further queried. If the information server needs to be further queried, step 2042 is performed; and if the information server does not need to be further queried, step 204 is performed.

Step 2042: The PPG sends a query message to the information server. Then, step 2043 is performed.

Step 2043: The PPG receives a query result returned by the information server. Then, step 204 is performed.

Steps 2041-2043 may be applicable to a following scenario: After the target terminals that correspond to the indication information are queried, the PPG judges whether online states or configuration conditions of these target terminals need to be further queried; if the online states or the configuration conditions of these target terminals need to be further queried, the PPG queries, to the information server, an on-line or configurable target terminal among the target terminals that correspond to the indication information, and sends the Push message of the corresponding DM management session to the on-line or configurable target terminal; and if the online states or the configuration conditions of these target terminals does not need to be further queried, the PPG sends the Push message of the corresponding DM management session to the target terminals that are queried in step 2032.

In this embodiment, the PPG queries and acquires the address information of the target terminals that correspond to the indication information from the information server according to the indication information included in the received Push message, so the DM server does not need to carry a large amount of address information of the target terminals in the Push message, thereby saving network resources. In addition, in this embodiment, the DM server does not need to maintain the address information of the target terminals in the network; when the DM server cannot acquire the address information of the target terminals that need to be managed, the sending of the Push message may also be implemented in this embodiment, so that security in acquiring user information by the DM server in the network may be ensured, thereby achieving a purpose of protecting user privacy. Meanwhile, the PPG provides functions of receiving the Push message, and implementing querying and matching, so as to bring forth better user experience.

Figure 5:
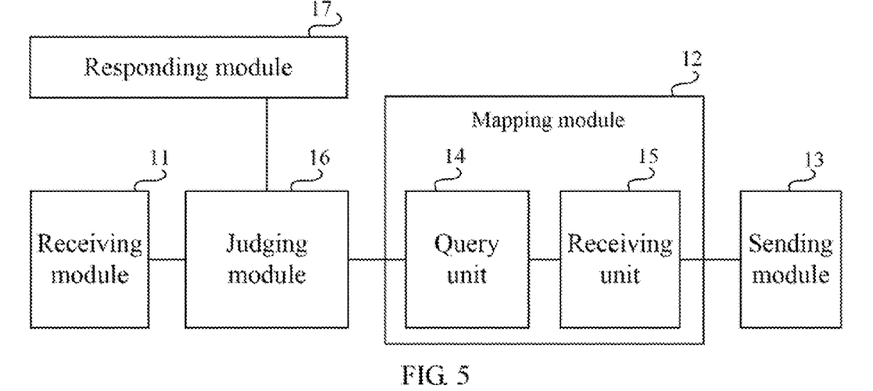

FIG. 5 is a schematic structural diagram of a push server according to a fifth embodiment of the present invention. The push server may be specifically a PPG applied in a DM service. As shown in FIG. 5, this embodiment specifically includes a receiving module 11, a mapping module 12, and a sending module 13. The receiving module 11 receives a Push message, in which the Push message includes indication information and push content; the mapping module 12 maps address information of target terminals that correspond to the indication information; and the sending module 13 sends the push content to the target terminals according to the indication information of the target terminals.

In addition, as an implementation mode, the mapping module 12 may be specifically configured to map the address information of the target terminals that correspond to the indication information in locally saved information.

In another implementation, the mapping module 12 may include a query unit 14 and a receiving unit 15. The query unit 14 sends a query message including the indication information to an information server; and the receiving unit 15 acquires the address information, which is returned by the information server according to the query message, of the target terminals that correspond to the indication information. In a practical application, an interface for communicating with the information server is added on the push server; through this interface, the query message may be sent to the information server, and the address information of the target terminals that is retuned by the information server is received.

Based on the foregoing two implementation modes, this embodiment may further include a judging module 16, in which the judging module 16 judges whether a PI is an authorized initiator, or judges whether the indication information is identifiable information, or judges whether the indication information is queriable information. When the judging module 16 determines that the PI is an authorized initiator, or the indication information is identifiable information, or the indication information is queriable information, the mapping module 12 maps the address information of the target terminals that correspond to the indication information.

This embodiment may further include a responding module 17, when the judging module 16 determines that the PI is not an authorized initiator, or the indication information is unidentifiable information, or the indication information is unqueriable information, the responding module 17 returns a failure response message or discards the Push message.

In this embodiment, the PPG has a function of querying and obtaining, according to the indication information, the address information of the target terminals that correspond to the indication information, so the DM server does not need to carry a large amount of address information of the target terminals in the Push message, thereby saving network resources, and bringing better user experience.

Figure 6:
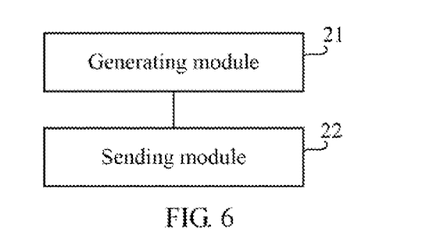

FIG. 6 is a schematic structural diagram of a PI server according to a sixth embodiment of the present invention. As shown in FIG. 6, the PT server in this embodiment may specifically include a generating module 21 and a sending module 22. The generating module 21 generates a Push message including indication information; and the sending module 22 sends the Push message including the indication information to a push server, so that the push server maps address information of target terminals that correspond to the indication information and sends the Push message to the target terminals according to the address information of the target terminals.

The PI server in this embodiment may be a DM server, a Push to talk over Cellular (POC) server, an Instant Message (IM) server, a CPM server, or a Mobile Advertisement (MobAD) server.

In this embodiment, the address information of the target terminals in the network does not need to be maintained and managed, so that security in acquiring user information in the network may be ensured, thereby achieving a purpose of protecting user privacy. Moreover, it is unnecessary to carry a large amount of address information of the target terminals in the Push message, thereby saving network resources.

Figure 7:
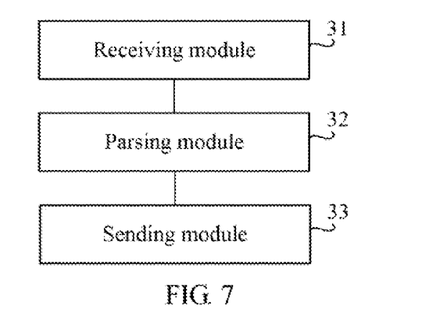

FIG. 7 is a schematic structural diagram of an information server according to a seventh embodiment of the present invention. As shown in FIG. 7, the information server in this embodiment specifically includes a receiving module 31, a parsing module 32, and a sending module 33. The receiving module 31 receives a query message including indication information; the parsing module 32 parses address information of target terminals that correspond to the indication information; and the sending module 33 sends the address information of the target terminals that correspond to the indication information to a sending party of the query message.

The information server in this embodiment may be a Presence server, a UAProf server, a CPM server, an HSS server, an HLR server, a CAB server, a DPE server, an XDM server, a CBUS server, a BCAST server, or a BM-SC server.

In this embodiment, the information server may parse, according to the indication information carried in the query message, the address information of the target terminals that correspond to the indication information, and send the address information of the target terminals that correspond to the indication information to a PPG.

Figure 8:
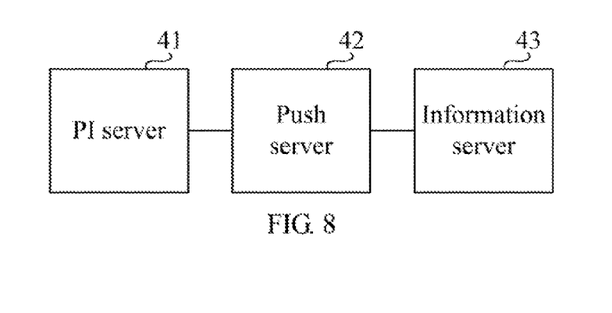

FIG. 8 is a schematic structural diagram of a system for processing a PTM Push message according to an eighth embodiment of the present invention. As shown in FIG. 8, the system in this embodiment specifically includes a PI server 41 and a push server 42. The PI server 41 generates and sends a Push message, in which the Push message includes indication information and push content; and the push server 42 receives the Push message, maps address information of target terminals that correspond to the indication information, and sends the push content to the target terminals according to the address information of the target terminals.

Further, the embodiment may further include an information server 43. The information server 43 may receive a query message that is sent by the push server 42 and includes the indication information, parse the address information of the target terminals that correspond to the indication information, and send the address information of the target terminals that correspond to the indication information to the push server 42.

In this embodiment, the push server acquires address information of corresponding target terminals according to indication information included in the received Push message, so the PI server does not need to carry a large amount of address information of the target terminals in the Push message, thereby saving network resources.

Persons of ordinary skill in the art should understand that all or a part of the steps of the methods according to the embodiments of the present invention may be implemented by a program instructing relevant hardware. The program may be stored in a computer readable storage medium. When the program is run, the steps of the methods according to the embodiments are performed. The storage medium may be any medium that is capable of storing a program code, such as a Read Only Memory (ROM), a Random Access Memory (RAM), a magnetic disk, and a Compact Disk-Read Only Memory (CD-ROM).

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for processing a Point to Multipoint (PTM) Push message, comprising:
receiving, by a push server, a Push message, wherein the Push message comprises terminal indication information, terminal network information, and push content;
querying, by the push server, locally stored information based at least in part upon both the terminal indication information and the terminal network information to determine whether address information of target terminals that correspond to the terminal indication information and the terminal network information is stored locally by the push server;
sending a first query message from the push server to an information server based on a determination that the push server does not locally store the address information of the target terminals;
receiving the address information of the target terminals from the information server;
sending a second query message from the push server to the information server to acquire state information of the target terminals, wherein the second query message is sent based at least in part on determining from the address information received from the information server that the state information of the target terminals is needed by the push server; and
sending the push content to the target terminals according to the address information and the state information of the target terminals.

2. The method for processing the PTM Push message according to claim 1, further comprising selecting the information server from a plurality of information servers according to a protocol associated with the terminal indication information.

3. The method for processing the PTM Push message according to claim 2, further comprising identifying the protocol associated with the terminal indication information from a plurality of different protocols, wherein the plurality of different protocols comprises a Session Initiation Protocol (SIP), a Hyper Text Transfer Protocol (HTTP), and an Extensible Markup Language Configuration Access Protocol (XCAP).

4. The method for processing the PTM Push message according to claim 1, wherein sending the push content to the target terminals according to the address information and the state information of the target terminals comprises:
determining one or more modes associated with the address information from a plurality of different possible modes, wherein the plurality of different possible modes comprises a unicast mode, a multicast mode, and a broadcast mode; and
sending the push content to the target terminals through the determined one or more modes.

5. The method for processing the PTM Push message according to claim 4, wherein the one or more modes associated with the address information comprises the multicast mode and/or the broadcast mode, and wherein sending the push content to the target terminals through the determined one or more modes comprises selecting one or more networks from a plurality of different possible networks and sending the push content to the target terminals using the selected one or more networks, wherein the plurality of different possible networks comprises a Cell Broadcast Service (CBS) bearer network, a Multimedia Broadcast Multicast Service (MBMS) network, a Broadcast/Multicast Services (BMS) bearer network, and a Mobile Broadcast Service (BCAST) bearer network.

6. The method for processing the PTM Push message according to claim 1, further comprising:
determining that a Push Initiator (PI) that sends the Push message to the push server is an authorized initiator;
determining that the terminal indication information is identifiable information; and
determining that the terminal indication information is queriable information.

7. The method for processing the PTM Push message according to claim 6, further comprising returning a failure response message from the push server to the PI or discarding the Push message when the PI is not the authorized initiator, the terminal indication information is unidentifiable information, or the terminal indication information is unqueriable information.

8. The method for processing the PTM Push message according to claim 1, wherein the terminal indication information is carried in a message body of the Push message.

9. The method for processing the PTM Push message according to claim 1, further comprising determining whether a Push Initiator (PI) server that sends the Push message to the push server is an authorized initiator, and wherein the terminal indication information comprises an indication of a specific model of a mobile terminal.

10. The method for processing the PTM Push message according to claim 1, wherein the Push message is encapsulated through a Push Access Protocol (PAP), and wherein the terminal indication information comprises terminal model information.

11. The method for processing the PTM Push message according to claim 1, wherein the terminal indication information comprises a terminal model, wherein the terminal network information identifies a network provider, wherein the Push message comprises an Extensible Markup Language (XML) message, and wherein the terminal indication information and the terminal network information are included in a body of the XML message.

12. The method for processing the PTM Push message according to claim 1, wherein the state information of the target terminals comprises online state information and configuration conditions of the target terminals.

13. A push server, comprising:
a communication interface configured to receive a Push message, wherein the Push message comprises terminal indication information, terminal network information, and push content; and
a processor coupled to the communication interface and configured to:
query locally stored information based at least in part upon both the terminal indication information and the terminal network information to determine whether address information of target terminals that correspond to the terminal indication information and the terminal network information is stored locally by the push server;
send a first query message from the push server to an information server based on a determination that the push server does not locally store the address information of the target terminals;
receive the address information of the target terminals from the information server;

send a second query message from the push server to the information server to acquire state information of the target terminals, wherein the second query message is sent based at least in part on determining from the address information received from the information server that the state information of the target terminals is needed by the push server; and send the push content through the communication interface to the target terminals according to the address information and the state information of the target terminals.

14. The push server according to claim 13, further comprising memory coupled to the processor, wherein the memory is configured to store address information corresponding to a plurality of different modes, wherein the plurality of different modes comprises a unicast mode, a multicast mode, and a broadcast mode, and wherein the processor is configured to send the push content through the communication interface according to one or more of the plurality of different modes.

15. The push server according to claim 13, wherein the information server comprises one or more of a plurality of different types of information servers, wherein the plurality of different types of information servers comprises a Presence server, a User Agent Profile (UAProf) server, a Converged Internet Protocol Messaging (CPM) server, a Home Subscriber Server (HSS), a Home Location Register (HLR), a Converged Address Book (CAB) server, a Device Profile Evolution (DPE) server, an Extensible Markup Language Document Management (XDM) server, a Condition Based Uniform Resource Indicator Selection (CBUS) server, a Mobile Broadcast Service (BCAST) server, a Broadcast Multicast Service Center (BM-SC) server, and wherein the processor is configured to select the one or more of the plurality of different types of information servers based at least in part on an indication of a server type included in the Push message.

16. The push server according to claim 13, wherein the processor is configured to judge whether a Push Initiator (PI) is an authorized initiator, judge whether the terminal indication information is identifiable information, or judge whether the terminal indication information is queriable information, and wherein the processor is configured to map the address information or send the terminal indication information when a judging result indicates that the PI is the authorized initiator, the terminal indication information is the identifiable information, or the terminal indication information is the queriable information.

17. The push server according to claim 16, wherein the processor is configured to return a failure response message from the push server to the information server through the communication interface or discard the Push message when the judging result indicates that the PI is not the authorized initiator, the terminal indication information is unidentifiable information, or the terminal indication information is unqueriable information.

18. The push server according to claim 13, wherein the processor is configured to determine whether a Push Initiator (PI) server that sends the Push message to the push server is an authorized initiator, and wherein the terminal indication information comprises an indication of a specific model of a mobile terminal.

19. The push server according to claim 13, wherein the terminal indication information comprises a terminal model, wherein the terminal network information identifies a network provider, wherein the Push message comprises an Extensible Markup Language (XML) message, and wherein the terminal indication information and the terminal network information are included in a body of the XML message.

20. The push server according to claim 13, wherein the state information of the target terminals comprises online state information and configuration conditions of the target terminals.

21. A system for processing a Point to Multipoint (PTM) Push message, comprising:
   a Push Initiator (PI) server configured to generate and send a Push message, wherein the Push message comprises terminal indication information, terminal network information, and push content, wherein the terminal indication information and the terminal network information are configured to be used to identify address information of target terminals but does not include the address information of the target terminals; and
   a push server configured to:
      receive the Push message;
      query locally stored information based at least in part upon both the terminal indication information and the terminal network information to determine whether the address information of the target terminals that correspond to the terminal indication information and the terminal network information is stored locally by the push server;
      send a first query message from the push server to an information server based on a determination that the lush server does not locall store the address information of the target terminals;
      receive the address information of the target terminals from the information server;
      send a second query message from the push server to the information server to acquire state information of the target terminals, wherein the second query message is sent based at least in part on determining from the address information received from the information server that the state information of the target terminals is needed by the push server; and
      send the push content to the target terminals according to the address information and the state information of the target terminals.

22. The system for processing the PTM Push message according to claim 21, wherein the push server is configured to determine whether a Push Initiator (PI) server that sends the Push message to the push server is an authorized initiator, and wherein the terminal indication information comprises an indication of a specific model of a mobile terminal.

23. The system for processing the PTM Push message according to claim 21, wherein the terminal indication information comprises a terminal model, wherein the terminal network information identifies a network provider, wherein the Push message comprises an Extensible Markup Language (XML) message, and wherein the terminal indication information and the terminal network information are included in a body of the XML message.

24. The system for processing the PTM Push message according to claim 21, wherein the state information of the target terminals comprises online state information and configuration conditions of the target terminals.

* * * * *

UNITED STATES PATENT AND TRADEMARK OFFICE
CERTIFICATE OF CORRECTION

| | | |
|---|---|---|
| PATENT NO. | : 8,965,985 B2 | Page 1 of 1 |
| APPLICATION NO. | : 13/300813 | |
| DATED | : February 24, 2015 | |
| INVENTOR(S) | : Shunan Fan, Jian Yang and Lei Wang | |

It is certified that error appears in the above-identified patent and that said Letters Patent is hereby corrected as shown below:

In the Claims

Column 16, Line 31, Claim 21 should read:
A system for processing a Point to Multipoint (PTM) Push message, comprising:
a Push Initiator (PI) server configured to generate and send a Push message, wherein the Push message comprises terminal indication information, terminal network information, and push content, wherein the terminal indication information and the terminal network information are configured to be used to identify address information of target terminals but does not include the address information of the target terminals; and
a push server configured to:
receive the Push message;
query locally stored information based at least in part upon both the terminal indication information and the terminal network information to determine whether the address information of the target terminals that correspond to the terminal indication information and the terminal network information is stored locally by the push server;
send a first query message from the push server to an information server based on a determination that the <u>push server does not locally</u> store the address information of the target terminals;
receive the address information of the target terminals from the information server;
send a second query message from the push server to the information server to acquire state information of the target terminals, wherein the second query message is sent based at least in part on determining from the address information received from the information server that the state information of the target terminals is needed by the push server; and
send the push content to the target terminals according to the address information and the state information of the target terminals.

Signed and Sealed this
Twenty-ninth Day of September, 2015

Michelle K. Lee
*Director of the United States Patent and Trademark Office*